US012600032B2

(12) United States Patent
    Galelli Christmann et al.

(10) Patent No.: US 12,600,032 B2
(45) Date of Patent: Apr. 14, 2026

(54) INTERMEDIATE POLICY TRAINING SYSTEM AND METHOD FOR AGENT

(71) Applicants: INVENTEC (PUDONG) TECHNOLOGY CORPORATION, Shanghai (CN); INVENTEC CORPORATION, Taipei City (TW)

(72) Inventors: Guilherme Henrique Galelli Christmann, Taipei City (TW); Ying-Sheng Luo, Taipei City (TW); Wei-Chao Chen, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 136 days.

(21) Appl. No.: 18/810,481

(22) Filed: Aug. 20, 2024

(65) Prior Publication Data

US 2025/0381666 A1     Dec. 18, 2025

(30) Foreign Application Priority Data

Jun. 12, 2024     (CN) .......................... 202410758217.2

(51) Int. Cl.
    *B25J 9/16*          (2006.01)
    *G05B 19/4155*      (2006.01)
(52) U.S. Cl.
    CPC ............. B25J 9/163 (2013.01); B25J 9/1605 (2013.01); B25J 9/161 (2013.01); G05B 19/4155 (2013.01); *G05B 2219/50391* (2013.01)

(58) Field of Classification Search
    CPC .......... B25J 9/161; B25J 9/1605; B25J 9/163; G05B 19/4155; G05B 2219/50391; G06N 3/006; B62D 57/032
    See application file for complete search history.

(56) References Cited

U.S. PATENT DOCUMENTS

2020/0239023 A1* 7/2020 Srinivasan ........... G05D 1/0027
2022/0075383 A1* 3/2022 Morad ..................... G06N 3/08

OTHER PUBLICATIONS

Ha, Reinforcement Learning for Improving Agent Design, 2019, Artificial Life 25: 352-365 (Year: 2019).*

* cited by examiner

*Primary Examiner* — Sze-Hon Kong
(74) *Attorney, Agent, or Firm* — Maschoff Brennan

(57) ABSTRACT

An intermediate policy training method for agent is provided. This method includes: selecting a source and a target policy from a plurality of policies. Each policy is configured to drive an agent to perform a plurality of actions to be in a plurality of states. Each state includes a plurality of physical properties. The method further includes: respectively selecting one from the source policy and the target policy as a source state and a target state; training an intermediate policy by a reinforcement learning to transition the agent from the source state to the target state over an episode, where the reinforcement learning includes an annealing function for setting a plurality of tolerance boundaries of the plurality of physical properties, and the tolerance boundaries gradually shrink during the episode.

10 Claims, 4 Drawing Sheets

S1

Selecting a source policy and a target policy from a plurality of policies

S2

Respectively selecting one of the plurality of states from the source policy and the target policy as a source state and a target state

S3

Training an intermediate policy by a reinforcement learning to transition the agent from the source state to the target state over an episode

INTERMEDIATE POLICY TRAINING SYSTEM AND METHOD FOR AGENT

CROSS-REFERENCE TO RELATED APPLICATIONS

This non-provisional application claims priority under 35 U.S.C. § 119 (a) on Patent Application No(s). 202410758217.2 filed in China on Jun. 12, 2024, the entire contents of which are hereby incorporated by reference.

BACKGROUND

1. Technical Field

The present disclosure relates to reinforcement learning, and more particularly to an intermediate policy training system and method for an agent.

2. Related Art

Reinforcement Learning (RL) for quadruped locomotion has achieved state-of-the-art status in recent years. Just a few years ago the best controllers were hand-crafted and well-tuned methods based on kinematic models of the robot. These traditional controllers had to consider approximations of real-world dynamics and required a lot of engineering effort to be effective. Nowadays, RL-based controllers can learn optimal policies from simulation in a data-based manner. These controllers can develop emergent behavior not previously possible and can tackle the most challenging terrains and environments. RL controllers can generate novel gaits that produce energy efficient movement. It can also generate the same visually aesthetic gaits that traditional controllers did with the addition of constraints.

A high-level task is commonly broken down into multiple lower-level tasks. In this scenario each low-level task is executed by a single, independent RL policy. However, an issue of connecting these multiple policies arises. Because each policy is trained independently, switching execution from a task policy to another is not always straightforward and simple.

A common practice to connect multiple low level policy tasks is to use a hierarchical approach, where a high-level policy outputs activation weights for lower-level policies. However, this becomes an issue when a new low-level policy must be added to the system. Because the high-level policy is conditioned on the low-level ones, the addition of a new policy requires retraining the whole system. Another potential downside of this approach is that the number of parameters of the high-level policy might need to be increased as the number of low-level policies grows.

SUMMARY

In light of the above descriptions, the present invention proposes a system and method for training an intermediate policy for an agent, thereby addressing the aforementioned issues.

According to one or more embodiment of the present disclosure, an intermediate policy training method for agent is performed by a processor and includes following steps: selecting a source policy and a target policy from a plurality of policies, where each policy is configured to drive an agent to perform a plurality of actions to be in a plurality of states, and each state includes a plurality of physical properties; respectively selecting one of the plurality of states from the source policy and the target policy as a source state and a target state; and training an intermediate policy by a reinforcement learning to transition the agent from the source state to the target state over an episode, where the reinforcement learning includes an annealing function for setting a plurality of tolerance boundaries of the plurality of physical properties, and the plurality of tolerance boundaries gradually shrink during the episode.

According to one or more embodiment of the present disclosure, an intermediate policy training system for agent include a storage device and a processor. The storage device is configured to store a plurality of instructions. The processor is electrically connected to the storage device to execute the plurality of instruction and cause a plurality of operations. The plurality of operations includes: selecting a source policy and a target policy from a plurality of policies, wherein each of the plurality of policies is configured to drive an agent to perform a plurality of actions to be in a plurality of states, with each of the plurality of state comprising a plurality of physical properties; respectively selecting one of the plurality of states from the source policy and the target policy as a source state and a target state; and training an intermediate policy by a reinforcement learning to transition the agent from the source state to the target state over an episode, wherein the reinforcement learning includes an annealing function for setting a plurality of tolerance boundaries of the plurality of physical properties, and the plurality of tolerance boundaries gradually shrink during the episode.

In view of the above, the intermediate policy training system and method for agent proposed in the present disclosure have the following contributions and effects: Firstly, a generic linking mechanism, the intermediate policy, can transition between any two reinforcement learning polices as long as a target state is provided. Secondly, the intermediate policy can smoothly transition to a generic target state via a shrinking boundaries reward function design.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
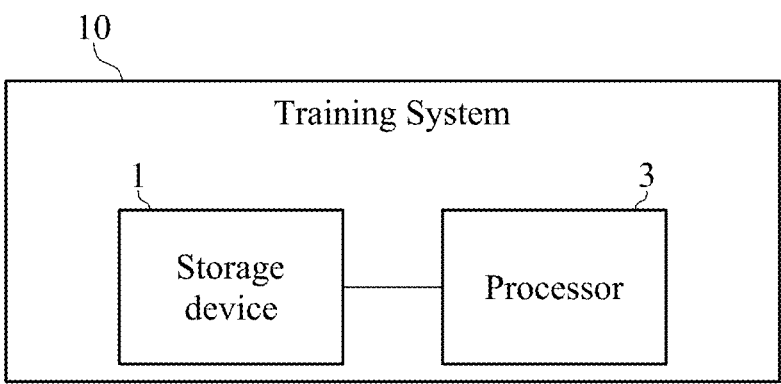
FIG. 1 is a block diagram of the intermediate policy training system for agent according to an embodiment of the present disclosure.

FIG. 1 is a block diagram of the intermediate policy training system for agent according to an embodiment of the present disclosure. As shown in FIG. 1, the training system 10 includes a storage device 1 and a processor 3.

The storage device 1 is configured to store a plurality of instructions. In an embodiment, the storage device 1 may be implemented using at least one of the following examples: flash memory, hard disk drive (HDD), solid-state drive (SSD), dynamic random-access memory (DRAM), static random-access memory (SRAM), or other non-volatile memory. However, the present disclosure is not limited to the examples mentioned above.

The processor 3 is electrically connected to the storage device 1 to execute the plurality of instructions and cause a plurality of operations corresponding to a plurality of steps of the intermediate policy training method for agent according to an embodiment of the present disclosure. In an embodiment, the processor 3 may be implemented using at least one of the following examples: personal computer, network server, central processing unit (CPU), graphics processing unit (GPU), microcontroller (MCU), application processor (AP), field-programmable gate array (FPGA), application-specific integrated circuit (ASIC), system-on-a-chip (SOC), deep learning accelerator, or any electronic device with similar functionality. The present disclosure does not limit the hardware type of the processor 3.

Figure 2:
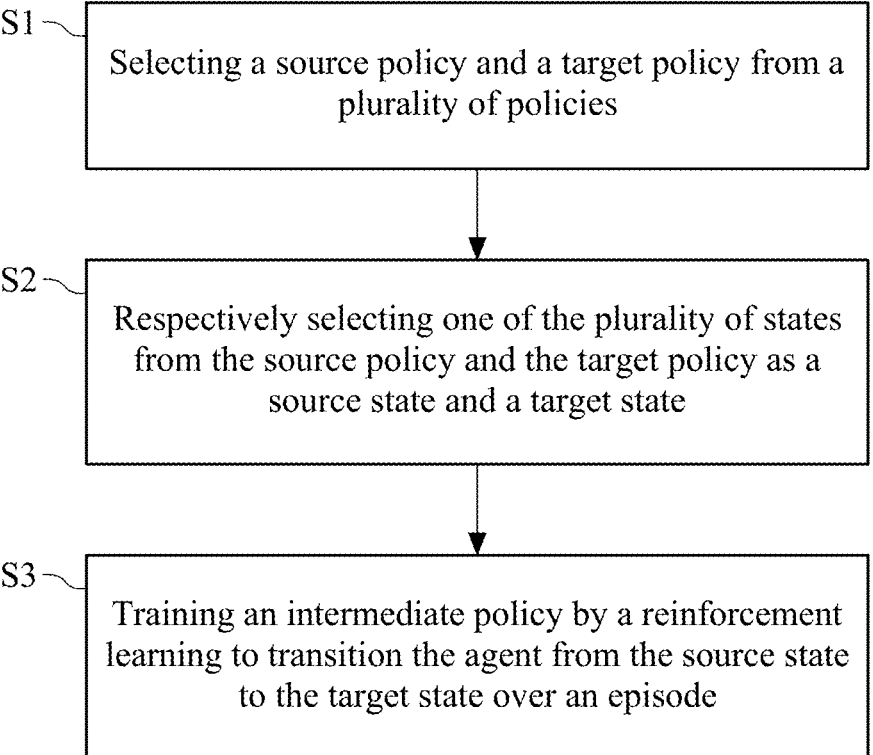
FIG. 2 is a flowchart of the intermediate policy training method for agent according to an embodiment of the present disclosure.

FIG. 2 is a flowchart of the intermediate policy training method for agent according to an embodiment of the present disclosure. In an embodiment, the agent is a Unitree A1 quadruped robot equipped with 12 Proportional-Derivative (PD) controllers, which drive a plurality of joints of the robot. However, the present disclosure does not limit the number of PD controllers and joints. The intermediate policy takes the current state and target state of the agent as inputs and generates novel transition trajectories to drive the agent towards the target state. As shown in FIG. 2, the training method includes steps S1, S2, and S3.

In step S1, the processor 3 selects a source policy and a target policy from a plurality of policies. Each policy is configured to drive the agent to perform a plurality of actions to be in a plurality of states. Each state includes a plurality of physical properties. In an embodiment, the plurality of physical properties includes: position, orientation, linear velocities, angular velocities, joint angles, and joint velocities, and binary feet contact indicators, where linear velocities may be estimated by fusing inertial measurement unit (IMU) readings and leg velocity during feet contacts.

In an embodiment, the plurality of policies mentioned in step S1 are pre-prepared. In another embodiment, before step S1, the training method further includes the following steps: collecting a plurality of reference motion clips or animation data, tracking the reference motion clips in a physics simulator, and training a plurality of physics-based controllers as the plurality of policies with a motion imitation framework. The plurality of policies may be denoted as $\pi_i(a|s, g_i)$; $i \in 1 \ldots k$, where a represents the actions executed by the PD controllers, s represents the state of the agent, $g_i$ represents the data of the reference motion clips (e.g., including four future frames), and k represents the number of policies. In the above embodiment, the motion imitation framework is implemented with Isaac Gym, and the plurality of policies are trained with PPO-clip loss on a consumer-grade laptop equipped with an Intel 8-core i7-11800H 2.3 GHz processor and an NVIDIA RTX 3070 8 GB GPU.

In an embodiment, to transfer the plurality of policies from simulation to the real world and ensure that each policy is robust enough when applied to a real-world robot, domain randomization is employed. Specifically, this involves randomizing the mass of each joint of the robot, introducing disturbance forces (applying random external forces to the agent), adding noise to sensor readings (simulating the errors in sensor readings in the real world), and randomizing terrain height and friction. The detailed parameters are shown in Table 1 below.

TABLE 1 parameters for domain randomization. Ranges are sampled uniformly. The feet contacts value indicates the probability of zeroing out (feet not touching the ground) the contacts, per foot.

| Parameter | Value | |
| --- | --- | --- |
| | Policy | Intermediate Policy |
| Action Noise | ±0.02 | ±0.02 |
| Rigid Bodies Mass | [75%, 125%] | [95%, 105%] |
| P Gain (PD Controller) | [35, 65] | [45, 55] |
| D Gain (PD | [1.0, 1.4] | [0.9, 1.2] |
| Ground Friction | [0.1, 1.5] | [0.1, 1.5] |
| Noise - Orientation | ±0.05 | ±0.06 |
| Noise - Linear Velocity | ±0.25 | ±0.25 |
| Noise - Angular Velocity | ±0.3 | ±0.3 |
| Noise - Joint Angles | ±0.02 | ±0.02 |
| Noise - Joint Velocity | — | ±1.5 |
| Noise - Feet Contacts | 20% | 20% |

In step S2, the processor 3 selects a source state from the plurality of states in the source policy and a target state from the plurality of states in the target policy. In an embodiment, the source and target states can be obtained by randomly sampling from a large set of physically feasible states or animation data, with noise added to the plurality of physical properties included in the target state. The intermediate policy will learn how to drive the agent from any given state to any target state.

In step S3, the processor 3 trains an intermediate policy by a reinforcement learning to transition the agent from the source state to the target state over an episode. The reinforcement learning involves an annealing function for setting a plurality of tolerance boundaries of the plurality of physical properties, and the plurality of tolerance boundaries gradually shrink during the episode.

The intermediate policy is configured to drive the agent to the target state by generating novel transition trajectories. The intermediate policy may be represented as $P(a_t|s_t, \hat{s})$, where $s_t$ represents the current state of the agent and $\hat{s}$ represents the target state. The current state $s_t$ is the same as the policy and consists of a plurality of physical properties: position, orientation, linear velocities, angular velocities, joint angles, and joint velocities, and binary feet contact indicators. The target state $\hat{s}$ represents the state of the agent should be after the transition. In an embodiment, if the target state $\hat{s}$ is derived from animation data, the binary feet contact indicator may be excluded from the plurality of physical properties included in $\hat{s}$ to reduce computational load.

The intermediate policy is trained with episodic reinforcement learning in a complete independent process from the aforementioned policies. During each episode, the goal of the intermediate policy is to match the target state $\hat{s}$. The architecture of the intermediate policy $P(a_t|s_t, \hat{s})$ is a two-layer feed-forward neural network with 512 and 256 hidden units. Except for the linear output layer, each layer uses the Exponential Linear Unit (ELU) as the activation function.

In an embodiment, the intermediate policy receives an observation vector of 208 dimensions which consists of the three latest states of the agent, the actions from the past three timesteps, the target state ŝ, the centers of the tolerance boundaries at the current timestep, and a single scalar that encodes the normalized time, starting at 0.0 and increasing to 1.0 at the end of the transition period (episode). The maximum episode length is set to 2 seconds. The output of the intermediate policy is configured to adjust the plurality of PD controllers, which in turn control the angles of the plurality of joints of the agent.

Figure 3:
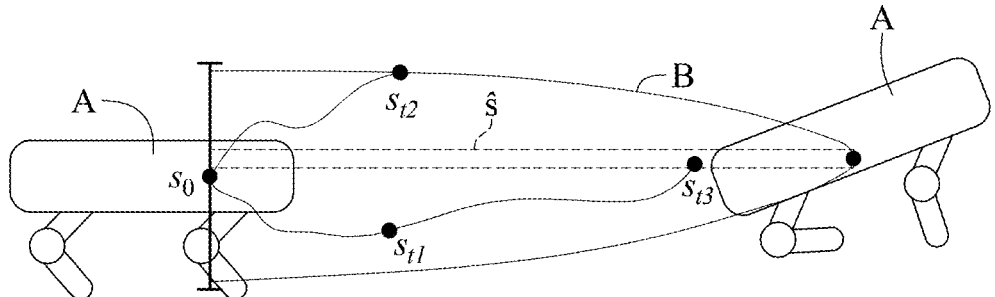
FIG. 3 is an example schematic diagram of gradually shrinking tolerance boundaries according to an embodiment of the present disclosure.

FIG. 3 is an example schematic diagram of gradually shrinking tolerance boundaries according to an embodiment of the present disclosure. As shown in FIG. 3, the tolerance boundary B is annealed around the line that connects the source state $s_0$ to the target state ŝ. The agent A learns to stay close to the target state ŝ while avoiding the gradually shrinking tolerance boundary B. The transition duration is dynamic, and an episode finishes early if all states remain within the tolerance boundary B before the episode ends. In fact, if the intermediate policy performs well, most transitions will indeed terminate early.

The reward function incentivizes the agent A to stay within a set of tolerance boundaries B for each physical property, such as joint positions, linear velocity, angular velocity, and orientation.

If the agent A is within the tolerance boundaries B for all physical properties at the end of the episode (e.g., current state $s_{t1}$), the intermediate policy receives a basic reward of +1. If the agent A violates any of the plurality of tolerance boundaries B before the episode ends (e.g., current state $s_{t2}$), the intermediate policy receives a negative reward of −1 and the episode terminates. If the agent A reaches the target state ŝ before the episode ends (e.g., current state $s_{t3}$) and all physical properties are within the tolerance boundaries B, the intermediate policy receives an additional reward of 100, greater than the basic reward of 1. These values are illustrative and not intended to limit the present disclosure.

In an embodiment, the reward function for reinforcement learning includes a set of indicator functions for the shrinking hard boundaries and an energy efficiency penalization term. The hard boundaries represent mandatory constraints, with penalties imposed for violations. The indicator function is defined as follows:

$$\beta = \begin{cases} 100, & \text{if } \max(|s_t - \hat{s}| - \sigma_e) \leq 0 \\ -1, & \text{if } \max(|s_t - \Psi(s_0, \hat{s}, t)| - \sigma_e) \geq 0 \\ 1, & \text{otherwise} \end{cases} \quad \text{(Equation 1)}$$

where $\psi(s_0, \hat{s}, t)$ denotes an annealing function, a linear function that connects the source state $s_0$ to the target state ŝ, and $\sigma_t$ denotes the tolerance, annealed at each timestep t according to Equation 2, $$\sigma_t = \sigma_s + t^p(\sigma_e - \sigma_s) \quad \text{(Equation 2)}$$

with $\sigma_s$ and $\sigma_e$ respectively denoting the tolerance at the start and at the end of the transition period, and p is an exponential parameter (refer to Table 2) to modify how the tolerance boundary B shrinks. With the tolerance boundary B annealing, the intermediate policy learns to match the target state ŝ closely. However, it does not guarantee that the trajectories are smooth or energy efficient. Therefore, the reward function also includes a penalization term for joint torques. In an embodiment, step S3 further includes: deducting a weighted sum of the torques of the joints from a reward obtained by the intermediate policy. The complete reward function is shown as follows in Equation 3, where $\tau_j$ is the torque of the j-th joint of the agent A, and $\omega_\tau$ is a scalar that controls the scale of the penalization:

$$R = \beta - \omega_\tau \sum_j \tau_j^2 \quad \text{(Equation 3)}$$

The Table 2 below is an example of detailed parameters for the tolerance boundary B and the penalization term.

TABLE 2 tunable parameters of the intermediate policy. $\sigma_s$ and $\sigma_e$ indicate the tolerance at the start and end of the transition, respectively.

| Component | Value | $\sigma_s$ | $\sigma_e$ |
|---|---|---|---|
| CoM (center of mass) - Height | p = 2 | 0.35 | 0.02 |
| Orientation | p = 4 | 1 | 0.2 |
| Linear Velocity | p = 8 | 2.5 | 0.2 |
| Angular Velocity | p = 8 | 15 | 0.2 |
| Joint Angles | p = 2 | 3.14 | 0.5 |
| Torque Term | $\omega_\tau = 0.0001$ | — | — |

Figure 4:
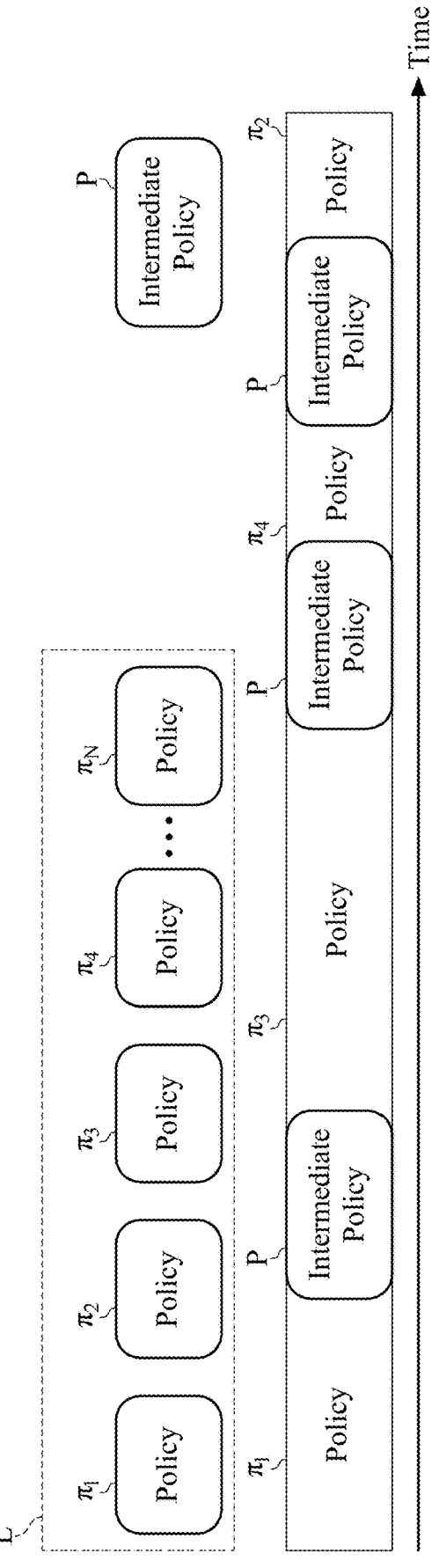
FIG. 4 is a schematic diagram showing a combination of the intermediate policy with other policies.

FIG. 4 is a schematic diagram showing a combination of the intermediate policy with other policies. As shown in FIG. 4, after training the intermediate policy P, various policies $\pi_1, \pi_2, \pi_3, \pi_4, \ldots, \pi_N$ can be sequentially combined. For example, The agent A may start with policy $\pi_1$, and at some later point, an event triggers a switch to another policy $\pi_3$. To execute the transition between these two policies $\pi_1$, $\pi_3$, the intermediate policy P takes control of the agent A and samples a target state ŝ from the distribution of $\pi_3$, using its animation data. Then, the intermediate policy P performs actions to drive the agent A to be close enough to the target state ŝ at the end of the transition, so that policy $\pi_3$ can take over control. The transition ends with the target policy $\pi_3$ taking control of the agent A. This process can be repeated indefinitely and robustly for any pair in the policy library L.

If the intermediate policy P is trained with a large enough distribution of source and target states, it is reasonable to assume that it should learn feasible transition between any policies, even new ones. For example, if the training data includes fast running actions both forward and backward (−1.0 m/s to 1.0 m/s), the agent A can also successfully transition during the testing phase with a slow walking action (0.5 m/s), because the slow walking speed is within the training range, even if the slow walking action itself is not in the training data. Therefore, by adding new policies and using the same intermediate policy P, the policy library L can be gradually and infinitely expanded without retraining or fine-tuning.

In view of the above, the intermediate policy training system and method for agent proposed in the present disclosure have the following contributions and effects: Firstly, a generic linking mechanism, the intermediate policy, can transition between any two reinforcement learning polices as long as a target state is provided. Secondly, the intermediate policy can smoothly transition to a generic target state via a shrinking boundaries reward function design.

What is claimed is:

1. An intermediate policy training method for agent, performed by a processor and comprising:

selecting a source policy and a target policy from a plurality of policies, wherein each of the plurality of policies is configured to drive an agent to perform a plurality of actions to be in a plurality of states, with each of the plurality of states comprising a plurality of physical properties;

respectively selecting one of the plurality of states from the source policy and the target policy as a source state and a target state; and training an intermediate policy by a reinforcement learning to transition the agent from the source state to the target state over an episode, wherein the reinforcement learning includes an annealing function for setting a plurality of tolerance boundaries of the plurality of physical properties, and the plurality of tolerance boundaries gradually shrink during the episode.

2. The intermediate policy training method for agent of claim 1, wherein a reward function of the reinforcement learning comprises:

the intermediate policy receiving a basic reward when the plurality of physical properties remains within the plurality of tolerance boundaries respectively at the end of the episode;

the intermediate policy receiving a negative reward when the plurality of physical properties violates any of the plurality of tolerance boundaries before the end of the episode; and the intermediate policy receiving an additional reward greater than the basic reward when the agent is in the target state and the plurality of physical properties remains within the plurality of tolerance boundaries before the end of the episode.

3. The intermediate policy training method for agent of claim 1, wherein the agent is a robot, the robot comprises a plurality of joints and a plurality of proportional-derivative controllers for driving the plurality of joints, and the physical properties comprises: position, orientation, linear velocities, angular velocities, joint angles, and joint velocities.

4. The intermediate policy training method for agent of claim 3, further comprising: deducting a weighted sum of torques of the plurality of joints from a reward obtained by the intermediate policy.

5. The intermediate policy training method for agent of claim 3, wherein the intermediate policy is a feed-forward neural network of two layers, with the two layers having 512 and 256 hidden units respectively, an activation function of the feed-forward neural network is an exponential linear unit, and inputs of the intermediate policy comprises: the target state, the plurality of tolerance boundaries, and a plurality of historical states and a plurality of historical actions of the agent, and an output of the intermediate policy is configured to set the plurality of proportional-derivative controllers.

6. An intermediate policy training system for agent, comprising:

a storage device configured to store a plurality of instructions; and a processor electrically connected to the storage device to execute the plurality of instructions and cause a plurality of operations, and the plurality of operations comprises:

selecting a source policy and a target policy from a plurality of policies, wherein each of the plurality of policies is configured to drive an agent to perform a plurality of actions to be in a plurality of states, with each of the plurality of states comprising a plurality of physical properties;

respectively selecting one of the plurality of states from the source policy and the target policy as a source state and a target state; and training an intermediate policy by a reinforcement learning to transition the agent from the source state to the target state over an episode, wherein the reinforcement learning includes an annealing function for setting a plurality of tolerance boundaries of the plurality of physical properties, and the plurality of tolerance boundaries gradually shrink during the episode.

7. The intermediate policy training system for agent of claim 6, wherein a reward function of the reinforcement learning comprises:

the intermediate policy receiving a basic reward when the plurality of physical properties remains within the plurality of tolerance boundaries respectively at the end of the episode;

the intermediate policy receiving a negative reward when the plurality of physical properties violates any of the plurality of tolerance boundaries before the end of the episode; and the intermediate policy receiving an additional reward greater than the basic reward when the agent is in the target state and the plurality of physical properties remains within the plurality of tolerance boundaries before the end of the episode.

8. The intermediate policy training system for agent of claim 6, wherein the agent is a robot, the robot comprises a plurality of joints and a plurality of proportional-derivative controllers for driving the plurality of joints, and the physical properties comprises: position, orientation, linear velocities, angular velocities, joint angles, and joint velocities.

9. The intermediate policy training system for agent of claim 8, further comprising: deducting a weighted sum of torques of the plurality of joints from a reward obtained by the intermediate policy.

10. The intermediate policy training system for agent of claim 8, wherein the intermediate policy is a feed-forward neural network of two layers, with the two layers having 512 and 256 hidden units respectively, an activation function of the feed-forward neural network is an exponential linear unit, and inputs of the intermediate policy comprises: the target state, the plurality of tolerance boundaries, and a plurality of historical states and a plurality of historical actions of the agent, and an output of the intermediate policy is configured to set the plurality of proportional-derivative controllers.

* * * * *